(12) United States Patent
Matsumura et al.

(10) Patent No.: US 12,513,731 B2
(45) Date of Patent: Dec. 30, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 434 days.

(21) Appl. No.: 17/995,954

(22) PCT Filed: Apr. 30, 2020

(86) PCT No.: PCT/JP2020/018291
§ 371 (c)(1),
(2) Date: Oct. 11, 2022

(87) PCT Pub. No.: WO2021/220472
PCT Pub. Date: Nov. 4, 2021

(65) Prior Publication Data
US 2023/0189320 A1    Jun. 15, 2023

(51) Int. Cl.
*H04W 72/542*    (2023.01)

(52) U.S. Cl.
CPC ............................... *H04W 72/542* (2023.01)

(58) Field of Classification Search
CPC . H04W 24/08; H04W 68/005; H04W 72/542; H04W 76/18
See application file for complete search history.

(56) References Cited

U.S. PATENT DOCUMENTS

| | | | |
|---|---|---|---|
| 2020/0351842 A1* | 11/2020 | Lin | H04B 7/086 |
| 2021/0274465 A1* | 9/2021 | Huang | H04W 68/005 |
| 2022/0131602 A1* | 4/2022 | Liberg | H04B 7/18504 |
| 2022/0338021 A1* | 10/2022 | He | H04L 5/0092 |
| 2023/0062459 A1* | 3/2023 | Abdelghaffar | H04B 7/0408 |
| 2023/0096215 A1* | 3/2023 | Cao | H04L 5/0053 370/329 |
| 2023/0155800 A1* | 5/2023 | Ghanbarinejad | H04L 5/0092 370/329 |

(Continued)

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

(Continued)

*Primary Examiner* — Michael Thier
*Assistant Examiner* — Prince A Mensah
(74) *Attorney, Agent, or Firm* — Osha Bergman Watanabe & Burton LLP

(57) ABSTRACT

A terminal according to an aspect of the present disclosure includes a receiving section that receives one or more synchronization signal blocks (SSBs) from one or more transmission points installed in a movement path, and a control section that determines a transmission configuration indication (TCI) state and an applicable duration of the TCI state to be applied to at least one of a channel and a signal received, based on measurement results of the one or more SSBs. According to an aspect of the present disclosure, radio communication in a moving object can be appropriately controlled.

6 Claims, 17 Drawing Sheets

(56) References Cited

U.S. PATENT DOCUMENTS

2023/0269796 A1\* 8/2023 Padebettu ............. H04L 69/324
370/329

OTHER PUBLICATIONS

International Search Report issued in International Application No. PCT/JP2020/018291, mailed Nov. 24, 2020 (3 pages).
Written Opinion issued in International Application No. PCT/JP2020/018291; Dated Nov. 24, 2020 (3 pages).

\* cited by examiner

FIG. 6A

| QCL OBTAINED THROUGH MEASUREMENT | DERIVED TCI STATE |
|---|---|
| SSB#0 | TCI STATE #0 |
| SSB#1 | TCI STATE #1 |
| ... | ... |
| SSB#63 | TCI STATE #63 |

FIG. 6B

| QCL OBTAINED THROUGH MEASUREMENT | RS HAVING RELATIONSHIP OF QCL TYPE A WITH QCL OBTAINED THROUGH MEASUREMENT | RS HAVING RELATIONSHIP OF QCL TYPE D WITH QCL OBTAINED THROUGH MEASUREMENT |
|---|---|---|
| SSB#0 | CSI-RS#0-0 | CSI-RS#1-0 |
| SSB#1 | CSI-RS#0-1 | CSI-RS#1-1 |
| ... | ... | ... |
| SSB#63 | CSI-RS#0-63 | CSI-RS#1-63 |

FIG. 9B
| Time | Transition | Dwell time |
|---|---|---|
| t0 | TCI STATE #0 | 4 |
| t1 | TCI STATE #1 | 3 |
| t2 | TCI STATE #2 | 2 |
| t3 | TCI STATE #3 | 2 |
| t4 | TCI STATE #4 | 3 |
| t5 | TCI STATE #5 | 4 |
FIG. 9A
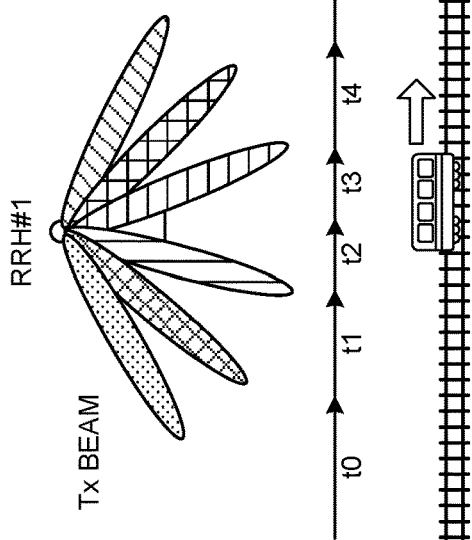
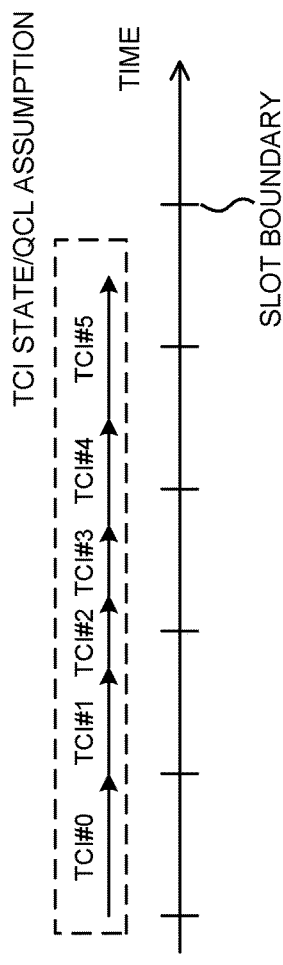

FIG. 11A

| RRHs | Distance/duration |
|---|---|
| RRH#n → RRH#n+1 | 3 |

FIG. 11B

| Index | RRHs | Distance/duration |
|---|---|---|
| 0 | RRH#0 → RRH#1 | 4 |
| 1 | RRH#1 → RRH#2 | 3 |
| 2 | RRH#2 → RRH#3 | 2 |
| 3 | RRH#3 → RRH#4 | 2 |
| 4 | RRH#4 → RRH#5 | 3 |
| 5 | RRH#5 → RRH#6 | 4 |

FIG. 12A

| Time | Transition | Dwell time |
|---|---|---|
| t0 | TCI STATE #0 | 4 |
| t1 | TCI STATE #1 | 3 |
| t2 | TCI STATE #2 | 2 |
| t3 | TCI STATE #3 | 2 |
| t4 | TCI STATE #4 | 3 |
| t5 | TCI STATE #5 | 4 |

FIG. 12B

| Time | Transition | Dwell time |
|---|---|---|
| t0 | TCI STATE #0, TCI STATE #1 | 4 |
| t1 | TCI STATE #1, TCI STATE #2 | 3 |
| t2 | TCI STATE #2, TCI STATE #3 | 2 |
| t3 | TCI STATE #3, TCI STATE #4 | 2 |
| t4 | TCI STATE #4, TCI STATE #5 | 3 |
| t5 | TCI STATE #5, TCI STATE #6 OR #1 | 4 |

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), in order to implement radio communication in a moving object (for example, a train or the like) that moves at a high speed, using beams transmitted from transmission points (for example, Remote Radio Heads (RRHs)) installed in a path of the moving object is assumed.

However, how to control radio communication in the moving object by using the beams transmitted from the respective transmission points has not yet been fully studied.

In view of this, the present disclosure has one object to provide a terminal, a radio communication method, and a base station that enable appropriate control of radio communication in a moving object.

Solution to Problem

A terminal according to an aspect of the present disclosure includes a receiving section that receives one or more synchronization signal blocks (SSBs) from one or more transmission points installed in a movement path, and a control section that determines a transmission configuration indication (TCI) state and an applicable duration of the TCI state to be applied to at least one of a channel and a signal received, based on measurement results of the one or more SSBs.

Advantageous Effects of Invention

According to an aspect of the present disclosure, radio communication in a moving object can be appropriately controlled.

BRIEF DESCRIPTION OF DRAWINGS

FIG. 6A and FIG. 6B are each a diagram to show an example of correspondence according to a third embodiment;

FIG. 9A and FIG. 9B are each a diagram to show another example of communication control according to the fourth embodiment;

FIG. 11A and FIG. 11B are each a diagram to show an example of a table indicating a distance between RRHs according to the fourth embodiment;

FIG. 12A and FIG. 12B are each a diagram to show an example of correspondence between the TCI states and beam durations according to the fourth embodiment;

DESCRIPTION OF EMBODIMENTS (HST)

In NR, in order to perform communication with a terminal (hereinafter also referred to as a UE) included in a moving object (HST (high speed train) that moves at a high speed, such as a train, using beams transmitted from transmission points (for example, RRHs) is assumed. In an existing system (for example, Rel. 15), performing communication with the moving object by transmitting a uni-directional beam from each RRH is supported (see FIG. 1A).

Figure 1A:
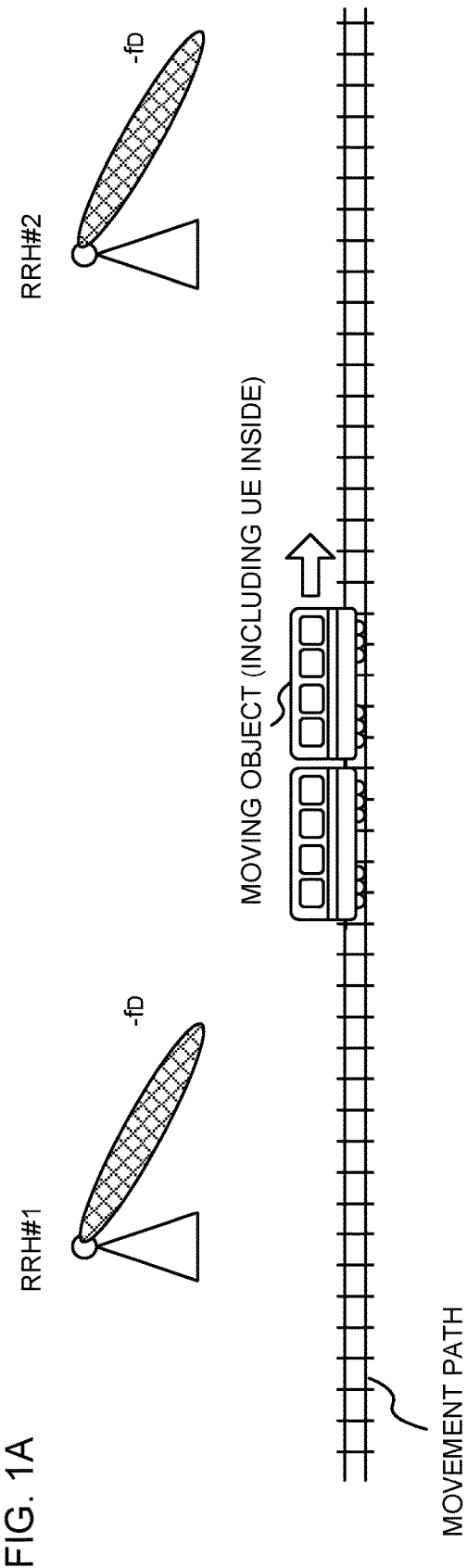
FIG. 1A and FIG. 1B are each a diagram to show an example of communication between a moving object and transmission points (for example, RRHs)

FIG. 1A shows a case in which RRHs are installed along a movement path (or a moving direction, a traveling direction, a traveling path) of the moving object, and a beam is formed from each RRH toward the traveling direction of the moving object. The RRH that forms the uni-directional beam may be referred to as a uni-directional RRH. In the example shown in FIG. 1A, the moving object receives a negative Doppler shift $(-f_D)$ from each RRH.

Note that, here, a case in which a beam is formed toward the traveling direction of the moving object is shown. However, this is not restrictive, and a beam may be formed toward a direction opposite to the traveling direction, or a beam may be formed in every direction regardless of the traveling direction of the moving object.

In Rel. 16 and later versions, it is also assumed that a plurality (for example, two or more) of beams are transmitted from an RRH. For example, it is assumed that the beams are formed in both of the traveling direction of the moving object and the direction opposite to the traveling direction (see FIG. 1B).

Figure 1B:
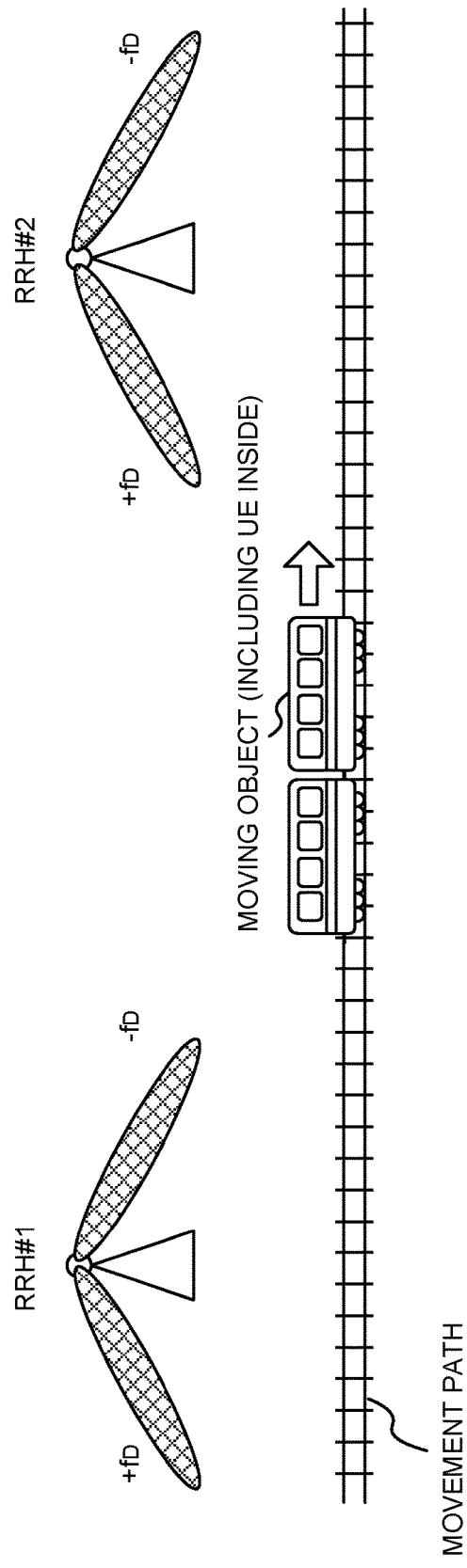

FIG. 1B shows a case in which the RRHs are installed along the movement path of the moving object, and beams are formed from each RRH toward both of the traveling direction of the moving object and the direction opposite to the traveling direction. The RRH that forms the beams of the plurality of directions (for example, two directions) may be referred to as a bi-directional RRH.

In the example shown in FIG. 1B, when the moving object is located between two RRHs (here, RRH #1 and RRH #2), a signal subjected to a negative Doppler shift switches to a signal subjected to a positive Doppler shift having higher power. In this case, the maximum variation width of the Doppler shift that requires correction is a change from $-f_D$ to $+f_D$, which is doubled as compared to the case of the uni-directional RRH.

In future, it is desirable to support communication in the moving object that moves at a speed of 500 km/h or higher by using the plurality of RRHs installed in the movement path (without assistance of a macro cell).

At the same time, it is assumed that, when the moving object moves at a high speed, appropriately performing beam control and control of handover and the like is difficult.

For example, the beam control of existing systems (for example, Rel. 15 or earlier versions) is, for example, performed in procedures of L1-RSRP report, beam report (TCI state, spatial relation configuration, or activation), and determination of a receive beam. However, it is difficult to perform the series of procedures (for example, report of the TCI state, QCL assumption, and the like) using a method of the existing systems in a short passing period.

The handover control is, for example, performed in procedures of measurement report (L3-RSRP, L3-SINR report), handover indication, random access channel transmission, and RRC connection complete. However, it is difficult to perform the series of procedures in a short passing period.
(TCI, Spatial Relation, QCL)

For NR, control of reception processing (for example, at least one of reception, demapping, demodulation, and decoding) and transmission processing (for example, at least one of transmission, mapping, precoding, modulation, and coding) of at least one of a signal and a channel (referred to as a signal/channel) in the UE based on a transmission configuration indication state (TCI state) has been under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

In the present disclosure, for example, the higher layer signaling may be any one or combinations of Radio Resource Control (RRC) signaling, Medium Access Control (MAC) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state or the spatial relation is configured (indicated) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a tracking CSI-RS (also referred to as a Tracking Reference Signal (TRS)), and a QCL detection reference signal (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element of the TCI state ("TCI-state IE" of RRC) configured using higher layer signaling may include one or a plurality of pieces of QCL information ("QCL-Info"). The QCL information may include at least one of information related to the RS to have a QCL relationship (RS relation information) and information indicating a QCL type (QCL type information). The RS relation information may include information such as an index of the RS (for example, an SSB index, or a non-zero-power CSI-RS (NZP CSI-RS) resource ID (Identifier)), an index of a cell in which the RS is located, and an index of a Bandwidth Part (BWP) in which the RS is located.

In Rel-15 NR, as the TCI state of at least one of the PDCCH and the PDSCH, both of the RS of QCL type A and the RS of QCL type D, or only the RS of QCL type A may be configured for the UE.

In a case where the TRS is configured as the RS for the QCL type A, unlike a demodulation reference signal (DMRS) for the PDCCH or the PDSCH, the TRS is expected to be transmitted such that the same TRS is periodically transmitted for an extended period of time. The UE can measure the TRS and calculate the average delay, the delay spread, and the like.

In a case where the TRS is configured for the UE as the RS for the QCL type A, in the TCI state of the DMRS for the PDCCH or the PDSCH, the UE can assume that the DMRS for the PDCCH or the PDSCH is the same as the QCL type A parameters (average delay, delay spread, and the like) for the TRS. Thus, the type A parameters (average delay, delay spread, and the like) for the DMRS for the PDCCH or the PDSCH can be determined from measurement results for the TRS. When performing channel estimation for at least one of the PDCCH and the PDSCH, the UE can use the measurement results for the TRS to perform more accurate channel estimation.

In a case where the RS for the QCL type D is configured for the UE, the UE can use the RS for the QCL type D to determine the UE receive beam (spatial domain reception filter, and UE spatial domain reception filter).

The RS for QCL type X for the TCI state may mean the RS in the QCL type X relationship with (the DMRS for) a certain channel/signal, and the RS may be referred to as a QCL source of the QCL type X for the TCI state.

<TCI State for PDCCH>

Information related to the QCL between the PDCCH (or a DMRS antenna port related to the PDCCH) and a certain RS may be referred to as a TCI state for the PDCCH or the like.

The UE may determine the TCI state for a UE-specific PDCCH (CORESET), based on higher layer signaling. For example, one or a plurality (K) of TCI states may be configured for the UE for each CORESET by using RRC signaling.

For the UE, for each CORESET, one of the plurality of TCI states configured by using RRC signaling may be activated by using the MAC CE. The MAC CE may be referred to as a TCI state indication MAC CE for a UE-specific PDCCH (TCI State Indication for UE-specific PDCCH MAC CE). The UE may perform monitoring of the CORESET, based on an active TCI state corresponding to the CORESET.

<TCI State for PDSCH>

Information related to the QCL between the PDSCH (or a DMRS antenna port related to the PDSCH) and a certain DL-RS may be referred to as a TCI state for the PDSCH or the like.

M (M≥1) TCI states for the PDSCH (M pieces of QCL information for the PDSCH) may be reported (configured) for the UE by using higher layer signaling. Note that the number M of TCI states configured for the UE may be restricted by at least one of UE capability and the QCL type.

The DCI used for scheduling of the PDSCH may include a certain field (which may be referred to as, for example, a TCI field, a TCI state field, or the like) indicating the TCI state for the PDSCH. The DCI may be used for scheduling of the PDSCH of one cell, and may be referred to as, for example, DL DCI, DL assignment, DCI format 1_0, DCI format 1_1, or the like.

Whether or not the TCI field is included in the DCI may be controlled with information reported from the base station to the UE. The information may be information (for example, TCI presence information, TCI presence in DCI information, higher layer parameter TCI-PresentInDCI) indicating whether the TCI field is present or absent in the DCI. The information may be, for example, configured for the UE using higher layer signaling.

When more than eight types of TCI states are configured for the UE, eight or less types of TCI states may be activated (or indicated), using the MAC CE. The MAC CE may be referred to as a TCI state activation/deactivation MAC CE for a UE-specific PDSCH (TCI States Activation/Deactivation for UE-specific PDSCH MAC CE). The value of the TCI field in the DCI may indicate one of the TCI states activated using the MAC CE.

When the TCI presence information set as "enabled" is configured for the UE for the CORESET for scheduling the PDSCH (CORESET used for PDCCH transmission for scheduling the PDSCH), the UE may assume that the TCI field is present in DCI format 1_1 of the PDCCH transmitted on the CORESET.

In a case in which the TCI presence information is not configured for the CORESET for scheduling the PDSCH, or the PDSCH is scheduled by DCI format 1_0, when a time offset between reception of the DL DCI (DCI for scheduling the PDSCH) and reception of the PDSCH corresponding to the DCI is equal to or larger than a threshold, in order to determine the QCL of a PDSCH antenna port, the UE may assume that the TCI state or the QCL assumption for the PDSCH is the same as the TCI state or the QCL assumption applied to the CORESET used for PDCCH transmission for scheduling the PDSCH.

In a case in which the TCI presence information is set as "enabled", when the TCI field in the DCI in a component carrier (CC) for scheduling (the PDSCH) indicates an activated TCI state in the scheduled CC or the DL BWP, and the PDSCH is scheduled by DCI format 1_1, in order to determine the QCL of the PDSCH antenna port, the UE may use the TCI in accordance with the value of the TCI field in the detected PDCCH including the DCI. When the time offset between reception of the DL DCI (for scheduling the PDSCH) and the PDSCH corresponding to the DCI (PDSCH scheduled by the DCI) is equal to or larger than the threshold, the UE may assume that the DM-RS port of the PDSCH of the serving cell is quasi co-located (QCLed) with the RS in the TCI state related to a QCL type parameter given by the indicated TCI state.

In both of the case in which the TCI in DCI information (higher layer parameter TCI-PresentInDCI) is set to "enabled" and the case in which the TCI in DCI information is not configured in an RRC connected mode, when the time offset between reception of the DL DCI (DCI for scheduling the PDSCH) and its corresponding PDSCH (PDSCH scheduled by the DCI) is less than the threshold, the UE may assume that the DM-RS port of the PDSCH of the serving cell has the minimum (lowest) CORESET-ID in the latest (most recent) slot in which one or more CORESETs in the active BWP of the serving cell are monitored by the UE, and is quasi co-located with the RS related to the QCL parameter used for QCL indication of the PDCCH of the CORESET associated with the monitored search space. The RS may be referred to as a default TCI state of the PDSCH or a default QCL assumption of the PDSCH.

The time offset between the reception of the DL DCI and the reception of the PDSCH corresponding to the DCI may be referred to as a scheduling offset.

The threshold may be referred to as time duration for QCL, a "timeDurationForQCL", a "Threshold", a "Threshold for offset between a DCI indicating a TCI state and a PDSCH scheduled by the DCI", a "Threshold-Sched-Offset", a schedule offset threshold, a scheduling offset threshold, or the like.

The time duration for QCL may be based on the UE capability, and may be, for example, based on a delay due to decoding of the PDCCH and beam switch. The time duration for QCL may be a minimum period of time that is required for the UE to perform PDCCH reception and application of spatial QCL information received in the DCI for PDSCH processing. The time duration for QCL may be represented by the number of symbols for each subcarrier spacing, or may be represented by time (for example, μs). Information of the time duration for QCL may be indicated from the UE to the base station as UE capability information, or may be configured from the base station to the UE by using higher layer signaling.

For example, the UE may assume that the DMRS port of the PDSCH is quasi co-located with the DL-RS that is based on the TCI state activated for the CORESET corresponding to the minimum CORESET-ID. The latest slot may be, for example, a slot in which the DCI for scheduling the PDSCH is received.

Note that the CORESET-ID may be an ID configured by using the RRC information element "ControlResourceSet" (ID for identification of the CORESET, controlResourceSetId).

When the CORESET is not configured for a CC, the default TCI state may be an activated TCI state that has the lowest ID and can be applied to the PDSCH in the active DL BWP of the CC.

(SSB)

In NR, the SSB is used in initial access and beam measurement. The UE, when compared with existing LTE systems, receives the SSB transmitted from a network (an NW, for example, a base station (gNB), an RRH) in a wider bandwidth (for example, 20 resource blocks (RBs)) and less time resources (for example, four symbols).

In a more flexible and longer transmission period, the SSB is transmitted. Specifically, the transmission period of the SSB is configured from {5, 10, 20, 40, 80, 160} ms.

In addition, in LTE, a synchronization signal (PSS/SSS) and PBCH symbol position is fixed to a single position, whereas in NR, a plurality of SSB symbol position candidates may be configured within 5 ms being half a radio frame. Specifically, in NR, 4, 8, and 64 SSB symbol positions are respectively determined in frequency ranges of 0 to 3 GHz, 3 to 6 GHz, and 6 to 52.6 GHz.

Figure 2:
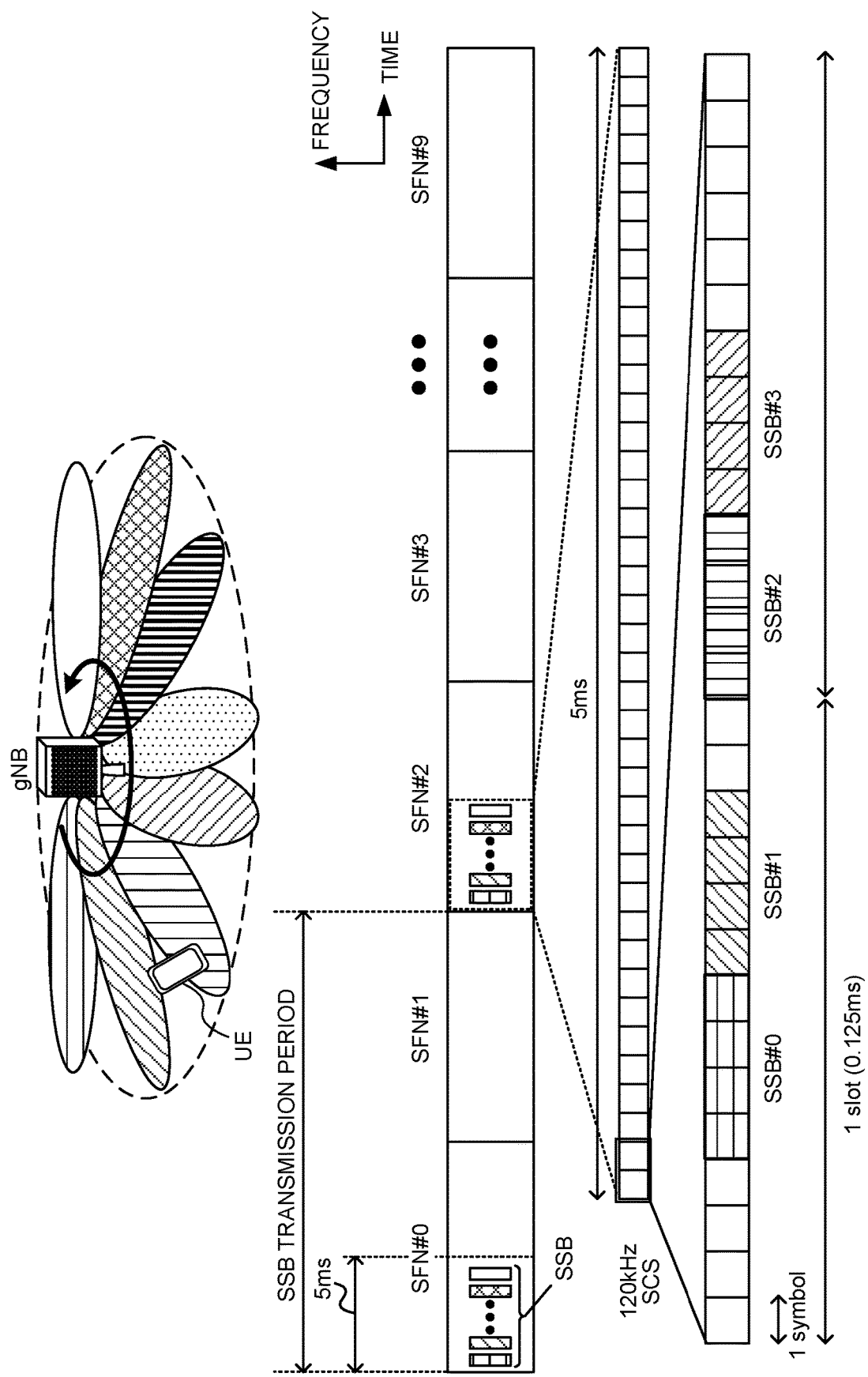
FIG. 2 is a diagram to show an example of a beam sweeping method for SSB transmission performed by an NW.

FIG. 2 is a diagram to show an example of a beam sweeping method for SSB transmission performed by the NW. In the example shown in FIG. 2, with the use of a plurality of beams, a plurality of SSBs corresponding to the plurality of beams are transmitted from the gNB. Among the plurality of SSBs, the same cell ID may be configured. An SSB index may be configured for each of the plurality of SSBs. The SSB index may indicate an SSB temporal position within 5 ms being half a radio frame.

In the example shown in FIG. 2, a maximum of 64 SSBs are configured within a range of first 5 ms of each radio frame (10 ms). The transmission period of the SSB is 20 ms. For example, when the subcarrier spacing is 120 kHz, one slot is 0.125 ms. In the example shown in FIG. 2, the gNB transmits two SSBs each in time of four symbols in each slot. Note that the method of transmitting the SSB shown in FIG. 2 is merely an example, and this is not restrictive.

In NR, a scheme in which the NW transmits one or more SSBs/CSI-RSs in one TCI state or TCI state duration (for example, TCI-state/QCL duration) has been under study. In this case, the NW may transmit the SSB(s)/CSI-RS(s) using a method defined in Rel. 15.

Figure 3:
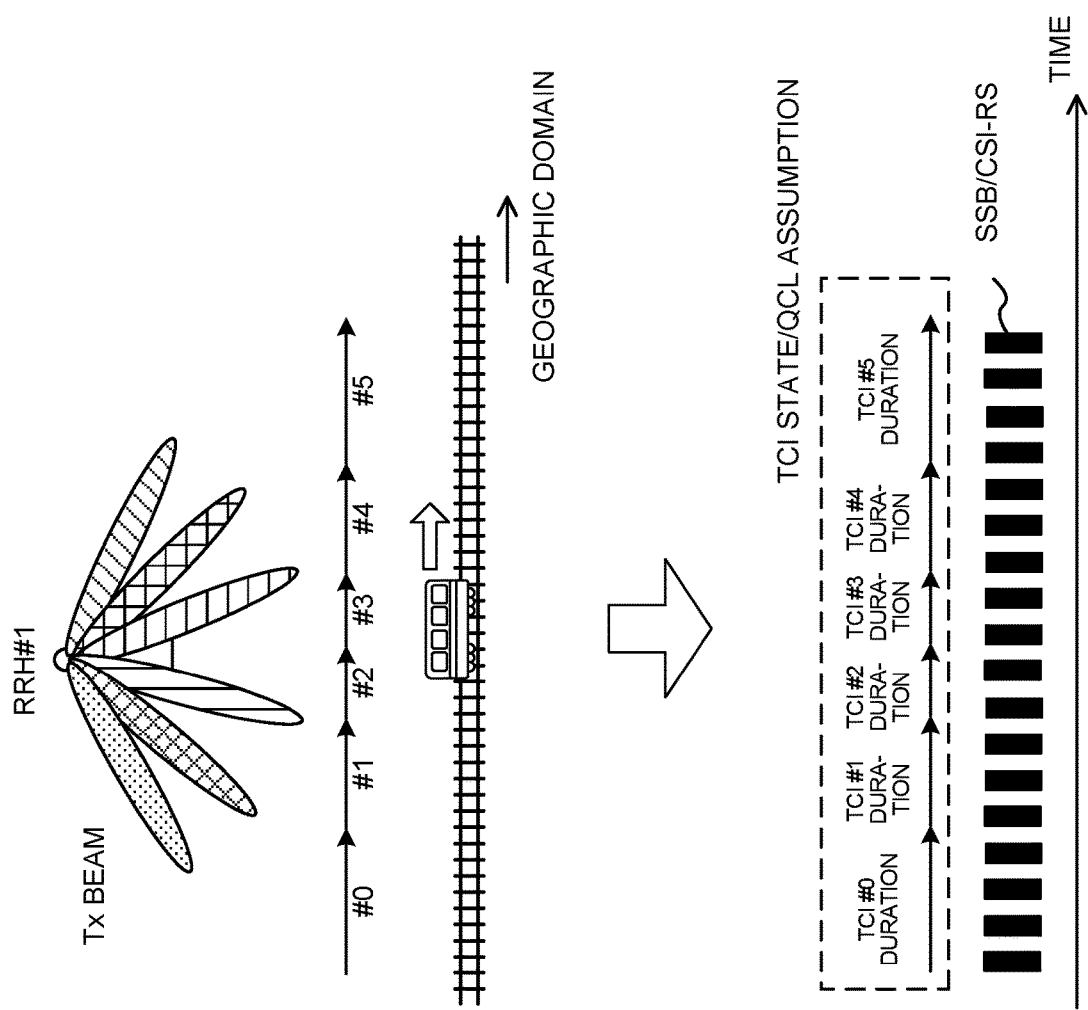
FIG. 3 is a diagram to show an example of a method of communication with a transmission point installed in a movement path of the moving object.

FIG. 3 shows an example of a case in which the moving object performs communication with the transmission point (here, RRH #1) installed in the movement path. Here, a case in which the RRH transmits a DL signal/DL channel using a plurality of beams is shown. The transmission point may be at least one of the uni-directional RRH and the bi-directional RRH.

In the example of FIG. 3, each beam transmitted from the RRH corresponds to one TCI state. Each TCI state may have a TCI state duration (TCI #X duration). In the example of FIG. 3, the UE included in the HST may receive one or more SSBs in one duration to which the TCI state is applied.

In this manner, it is expected that, when the UE receives one or more SSBs in one duration to which the TCI state is applied, the UE performs blind detection of the TCI state/QCL assumption/QCL duration to be applied to communication with the NW through measurement of the SSBs/CSI-RSs. In other words, it is expected that the UE performs beam transition in a blind manner, based on information related to beam transition. In this case, the UE determines (updates) the duration of the TCI state corresponding to the SSB having high received power/received quality, and performs communication with the NW.

However, a method of determining the TCI state/QCL assumption based on measurement of the SSBs/CSI-RSs by the UE included in the moving object has not yet been fully studied. If the method is not fully studied, enhancement of communication throughput may be suppressed.

In view of this, the inventors of the present invention focused on determination of a beam (or a TCI state, a QCL assumption) in the moving object, studied communication control of the moving object (or the UE included in the moving object) and the RRH, and came up with the idea of the present embodiments. Specifically, the inventors of the present invention came up with the idea of a method in which the UE included in the moving object moving at a high speed determines a beam used for communication with the NW through measurement of the SSBs/CSI-RSs.

Embodiments according to the present disclosure will be described in detail with reference to the drawings as follows. The configurations described in aspects of respective embodiments may each be employed individually, or may be employed in combination.

A TCI state, a TCI state or a QCL assumption, a TCI state duration, a QCL assumption, a QCL duration, a QCL parameter, a spatial domain reception filter, a UE spatial domain reception filter, a spatial domain filter, a UE receive beam, a DL receive beam, DL precoding, a DL precoder, a DL-RS, a QCL parameter followed by a DMRS port, an RS of the QCL type D of a TCI state or a QCL assumption, and an RS of the QCL type A of a TCI state or a QCL assumption may be interchangeably interpreted. An RS of the QCL type D, a DL-RS associated with the QCL type D, a DL-RS having the QCL type D, a source of the DL-RS, an SSB, and a CSI-RS may be interchangeably interpreted.

In the present disclosure, the TCI state may be information (for example, the DL-RS, the QCL type, a cell in which the DL-RS is transmitted, or the like) related to a receive beam (spatial domain reception filter) indicated (configured) for the UE. The QCL assumption may be information (for example, the DL-RS, the QCL type, a cell in which the DL-RS is transmitted, or the like) related to a receive beam (spatial domain reception filter) that is assumed by the UE, based on transmission or reception of an associated signal (for example, a PRACH).

In the present disclosure, the moving object may be an object that moves at a certain speed or higher, and may be, for example, a train, an automobile, a motorcycle, a ship, or the like. Communication between the UE included in the moving object and the transmission point (for example, the RRH) may be performed directly between the UE and the transmission point, or may be performed between the UE and the transmission point via the moving object (for example, an antenna installed in the moving object or the like).

In the present disclosure, the UE included in the moving object (HST) may be simply referred to as a UE.

In the present disclosure, "A/B" may be interpreted as at least one of A and B, and "A/B/C" may be interpreted as at least one of A, B, and C.

(Radio Communication Method)

First Embodiment

The UE included in the HST may be configured with at least one of CSI-RS resources and SSB resources for QCL measurement (determination). In the present disclosure, the CSI-RS resources may be NZP-CSI-RS resources.

When the CSI-RS resources are not configured, the UE may use the SSB resources for QCL measurement. When the SSB resources are not configured, the UE may use the CSI-RS resources for QCL measurement.

The UE may use both of the CSI-RS resources and the SSBs for QCL measurement.

The UE may identify (determine) the TCI state/QCL assumption/QCL duration, based on received power/received quality (for example, at least one of Reference Signal Received Power (RSRP), Reference Signal Received Quality (RSRQ), and a Signal to Interference plus Noise Ratio (SINR)) of at least one of the CSI-RSs and the SSBs. The UE may apply the identified TCI state/QCL assumption to reception of at least one of the PDCCH, the PDSCH, and the CSI-RS. The UE may apply the identified TCI state/QCL assumption/QCL duration to transmission of at least one of the PUCCH, the PUSCH, and the SRS.

According to the first embodiment, at least one of reception of a downlink channel/signal and transmission of an uplink channel/signal performed by the UE can be appropriately controlled.

Second Embodiment

A second embodiment will describe an applicable timeline for a channel/signal of the TCI state/QCL assumption/QCL duration determined based on measurement of at least one of the CSI-RS resources and the SSBs.

Regarding the TCI state/QCL assumption/QCL duration identified (updated) by the UE included in the HST, the UE may assume that the TCI state/QCL assumption is to be applied after specific time has elapsed since measurement of one or more SSBs/CSI-RSs. The specific time may be based on a transmission period of the SSBs/CSI-RSs.

Specifically, the UE may assume that the TCI state/QCL assumption/QCL duration is to be applied after specific time has elapsed since the last symbol (slot) in which the SSBs/CSI-RSs are transmitted in a measurement range configured for each specific period. The specific time may be, for example, based on a certain time resource (for example, at least one of a subframe, a slot, a sub-slot, and a symbol), or may be T ms (T is any value). The specific time may be, for example, time until certain time (for example, at least one of n ms, n symbols, and n slots (n is any value)) further elapses after a certain time resource (for example, at least one of a subframe, a slot, a sub-slot, and a symbol) has elapsed.

The UE included in the HST may assume that the TCI state/QCL assumption/QCL duration is to be applied after one or more SSBs/CSI-RSs are transmitted a specific number (for example, N (N is any value)) of times and specific time has then elapsed since the last symbol in which the specific number-th SSBs/CSI-RSs are transmitted. The specific time may be, for example, based on a certain time resource (for example, at least one of a subframe, a slot, a sub-slot, and a symbol), or may be T ms (T is any value). The specific time may be, for example, time until certain time (for example, at least one of n ms, n symbols, and n slots (n is any value)) further elapses after time of a certain time resource (for example, at least one of a subframe, a slot, a sub-slot, and a symbol) has elapsed.

Note that, in this case, the UE may calculate an average value of results of measurements for each of one or more SSBs/CSI-RSs the specific number of times, and determine the TCI state/QCL assumption/QCL duration, based on the calculated value.

Note that the specific number N of times may be defined in a specification in advance, may be configured for the UE using higher layer signaling, or may be a value reported to the NW using UE capability information (UE Capability).

Figure 4:
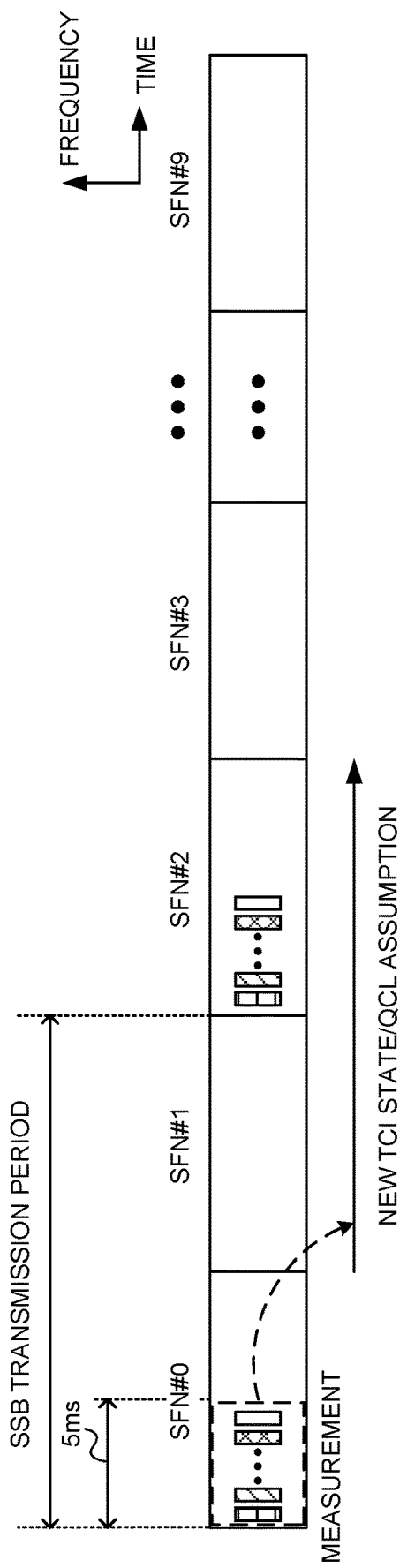
FIG. 4 is a diagram to show an example of an applicable duration of a TCI state/QCL assumption/QCL duration in SSB measurement.

FIG. 4 is a diagram to show an example of an applicable duration of the TCI state/QCL assumption/QCL duration in SSB measurement. The UE performs measurement of the SSBs in SFN #0. Subsequently, from the next SFN (SFN #1)

after measurement of the SSBs, the UE applies, to a channel/signal, a new TCI state/QCL assumption/QCL duration based on the measurement results of the SSBs in SFN #0 and performs communication with the NW.

Note that the SSB period and the applicable duration of the TCI state/QCL assumption shown in FIG. 4 are merely examples, and these are not restrictive.

Regarding the TCI state/QCL assumption/QCL duration identified (updated) by the UE included in the HST, the UE may assume that the TCI state/QCL assumption/QCL duration is to be applied until specific time elapses.

For example, after performing measurement of one or more SSBs/CSI-RSs (first SSBs/CSI-RSs), the UE included in the HST may assume that the TCI state/QCL assumption/QCL duration through measurement of the first SSBs/CSI-RSs is applied until the TCI state/QCL assumption/QCL duration through measurement of the following one or more SSBs/CSI-RSs is applied.

For example, after a specific number (for example, N) of times of measurement of one or more SSBs/CSI-RSs, the UE may assume that the TCI state/QCL assumption/QCL duration is applied until the TCI state/QCL assumption/QCL duration through measurement of the next specific number of times of one or more SSBs/CSI-RSs is applied.

Note that the specific number N of times may be defined in a specification in advance, may be configured for the UE using higher layer signaling, or may be a value reported to the NW using UE capability information (UE Capability).

For example, the UE may be configured with a timer indicating time in which the TCI state/QCL assumption/QCL duration is applied. When a MAC layer of the UE receives information related to update of the TCI state/QCL assumption/QCL duration from a PHY layer of the UE, the MAC layer may start a specific timer. The MAC layer of the UE may apply the reported TCI state/QCL assumption to a channel/signal until the timer expires.

For example, the UE may receive information related to time (duration) in which the TCI state/QCL assumption/QCL duration is applied. The UE may determine (update) application of the TCI state/QCL assumption/QCL duration, based on the information.

The time may be defined in a specification in advance, may be configured for the UE using higher layer signaling, or may be a value reported to the NW using UE capability information (UE Capability). The time may be based on a certain time resource (for example, at least one of a subframe, a slot, a sub-slot, and a symbol), or may be T ms (T is any value).

For example, the UE may receive information related to update (switch) of application of the TCI state/QCL assumption/QCL duration from the NW. The UE may determine (update) application of the TCI state/QCL assumption/QCL duration, based on the information.

Figure 5:
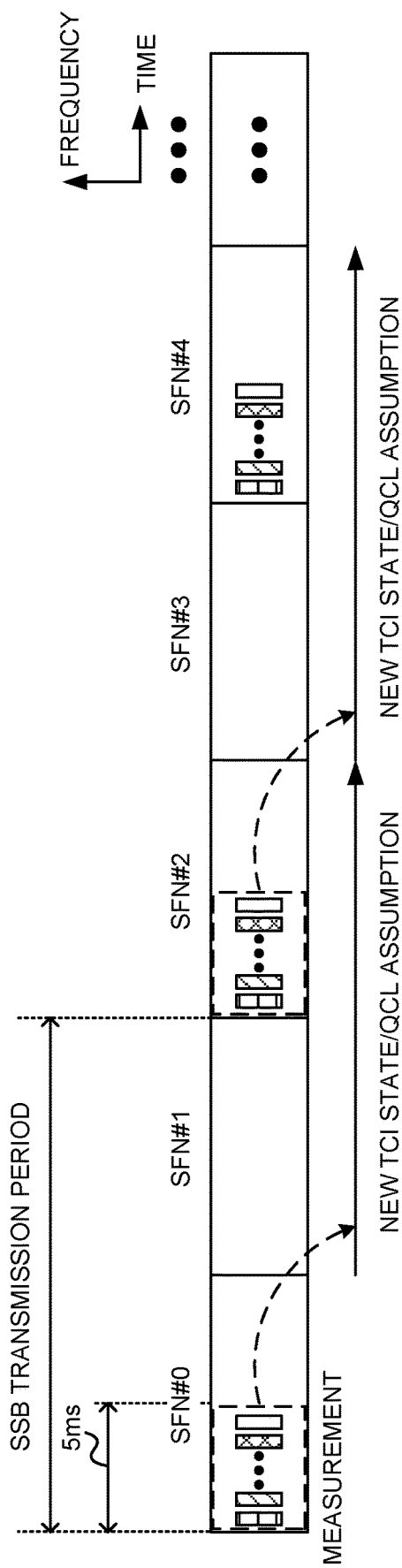
FIG. 5 is a diagram to show another example of the applicable duration of the TCI state/QCL assumption/QCL duration in SSB measurement.

FIG. 5 is a diagram to show another example of the applicable duration of the TCI state/QCL assumption/QCL duration in SSB measurement. The UE performs measurement of the SSBs in SFN #0. Subsequently, from the next SFN (start of SFN #1) after measurement of the SSBs in SFN #0 until application (end of SFN #2) of the TCI state/QCL assumption/QCL duration through measurement of the next SSBs, the UE applies a new TCI state/QCL assumption/QCL duration to a channel/signal, based on the measurement results of the SSBs in SFN #0. In addition, from the next SFN (start of SFN #3) after measurement of the SSBs in SFN #2 until application (end of SFN #4) of the TCI state/QCL assumption/QCL duration through measurement of the next SSBs, the UE applies a new TCI state/QCL assumption/QCL duration to a channel/signal, based on the measurement results of the SSBs in SFN #0.

Note that the SSB period and the applicable duration of the TCI state/QCL assumption/QCL duration shown in FIG. 5 are merely examples, and these are not restrictive.

According to the second embodiment described above, the applicable duration of the TCI state/QCL assumption/QCL duration through SSB/CSI-RS measurement can be appropriately controlled.

Third Embodiment

A third embodiment will describe information obtained through measurement of the SSBs/CSI-RSs of the UE included in the HST.

Through measurement of the SSBs/CSI-RSs performed by the UE, the UE may obtain information related to QCL assumption. In this case, the UE need not explicitly obtain a QCL type. In this case, the UE may apply the QCL assumption applied to the SSBs in the most recent initial access (or in which RACH transmission is performed) to transmission and/or reception of a channel/signal.

Through measurement of the SSBs/CSI-RSs performed by the UE, the UE may obtain information related to QCL assumption/TCI state. The information may explicitly indicate a specific QCL type (for example, the QCL type D). In this case, the UE may assume that a relationship between the measured SSBs/CSI-RSs and at least one of reception of a downlink channel/signal and transmission of an uplink channel/signal is of a specific QCL type (for example, the QCL type D).

Through measurement of the SSBs/CSI-RSs performed by the UE, the UE may obtain information related to QCL assumption/TCI state. The information may explicitly indicate a specific QCL type (for example, the QCL type A). In this case, the UE may assume that a relationship between the measured SSBs/CSI-RSs and at least one of reception of a downlink channel/signal and transmission of an uplink channel/signal is of a specific QCL type (for example, the QCL type A).

The UE may derive other information (for example, TCI state), based on the QCL assumption obtained through measurement of the SSBs/CSI-RSs.

For example, the UE may be configured with association between each of the SSBs/CSI-RSs (for example, SSB resource indices/CSI-RS resource indices) to be measured and the TCI states in advance by higher layer signaling. Subsequently, the UE may derive the TCI state, based on the SSBs/CSI-RSs identified through the measurement.

FIG. 6A is a diagram to show an example of correspondence between QCL assumptions obtained through measurement and derived TCI states. The UE may be configured with correspondence as shown in FIG. 6A in advance, and derive the TCI states, based on the correspondence. Note that the correspondence shown in FIG. 6A is merely an example, and this is not restrictive.

For example, the UE need not be configured with a relationship between each of the SSBs/CSI-RSs to be measured and the TCI states by higher layer signaling in advance. In this case, the UE may assume that the SSBs/CSI-RSs identified through measurement are RSs whose TCI state is of a specific type (for example, the type A or the type D).

For example, the UE need not be configured with a relationship between each of the SSBs/CSI-RSs to be measured and the TCI states by higher layer signaling in advance. In this case, the UE may assume that the RSs in a relationship of QCL assumption with the SSBs/CSI-RSs identified through measurement are RSs whose TCI state is of a specific type (for example, the type A or the type D).

In this case, the UE may be configured with correspondence between each of the SSBs/CSI-RSs to be measured and the RSs whose TCI state is of a specific QCL type (for example, at least one of the type A and the type D) in advance.

FIG. 6B is a diagram to show an example of correspondence between QCL assumptions obtained through measurement and RSs of specific QCL types with the QCL assumptions. The UE may be configured with the correspondence as shown in FIG. 6B in advance, and derive (determine) the RSs having a relationship of a certain QCL type (for example, at least one of the type A and the type D) with the QCL assumptions identified through measurement of the SSBs, based on the correspondence. Note that the correspondence shown in FIG. 6B is merely an example, and this is not restrictive.

Note that the QCL assumptions obtained in measurement and the RSs (for example, CSI-RSs #0 to X (X is an integer)) of the QCL type A with the QCL assumptions and the QCL assumptions obtained in measurement and the RSs (for example, CSI-RSs #1 to X) of the QCL type D with the QCL assumptions in FIG. 6B may be CSI-RSs whose CCs are different from each other.

The UE may be configured with correspondence between each of the SSBs/CSI-RSs to be measured and the RSs whose TCI state is of a first QCL type (for example, the type A) in advance. In this case, the UE may assume that the QCL assumptions obtained through measurement of the SSBs/CSI-RSs are RSs whose TCI state is of a second QCL type (for example, the type D).

According to the third embodiment described above, determination of the TCI state/QCL assumption through SSB/CSI-RS measurement can be flexibly controlled.

Fourth Embodiment

A fourth embodiment will describe a method in which the UE included in the HST determines the TCI state/QCL assumption/QCL duration used for transmission and/or reception to and from the NW, based on information related to beam transition.

In the present disclosure, the information related to beam transition may be interpreted as information related to transition of the SSBs, information related to transition of the CSI-RSs, and information related to transition of the SSBs/CSI-RSs. In the present disclosure, "transition" may be interchangeably interpreted as "vary", "update", "switch", "enable", "disable", "activate", "deactivate", "activate/deactivate", and the like.

The UE may determine the TCI state/QCL assumption/QCL duration used for transmission and/or reception to and from the NW, based on the information related to beam transition. The information related to beam transition may be reported to the UE, based on at least one of higher layer signaling and physical layer signaling. The information related to beam transition and the method of reporting the information will be described below in detail.

The UE may implicitly determine the information related to beam transition. For example, the UE may receive reporting of the SSB/CSI-RS resources corresponding to each beam, and implicitly determine (estimate) the information related to beam transition, based on at least one of received power/received quality (at least one of RSRP, RSRQ, and SINR) of the SSBs/CSI-RSs and a moving speed of the UE.

Note that the moving speed of the UE may be at least one of information related to estimation of the moving speed of the UE estimated by the UE itself and information related to estimation of the moving speed of the UE reported from the NW.

The UE may perform measurement of the SSBs/CSI-RSs, based on the information related to beam transition. The UE may update (determine) the TCI state/QCL assumption/QCL duration, based on the measurement results of the SSBs/CSI-RSs. Subsequently, the UE may perform at least one of reception of a downlink channel/signal (for example, at least one of the PDCCH, the PDSCH, and the CSI-RS) and transmission of an uplink channel/signal (for example, at least one of the PUCCH, the PUSCH, and the SRS), using the updated TCI state/QCL assumption/QCL duration.

In this case, the UE may perform beam transition, based on received power/received quality (at least one of the RSRP, the RSRQ, and the SINR) of the SSBs/CSI-RSs included in the information related to beam transition.

For example, the UE may measure the received power/received quality (at least one of the RSRP, the RSRQ, and the SINR) of the SSBs/CSI-RSs included in the information related to beam transition, and when "a measurement value of an assumed beam before transition"–"a measurement value of a beam after transition" is equal to or less than (or is less than) a threshold (for example, X dB (X is any value)), the UE may perform beam transition.

The value of X may be defined in a specification in advance, may be configured for the UE using higher layer signaling, or may be a value reported to the NW using UE capability information (UE Capability).

Figure 7:
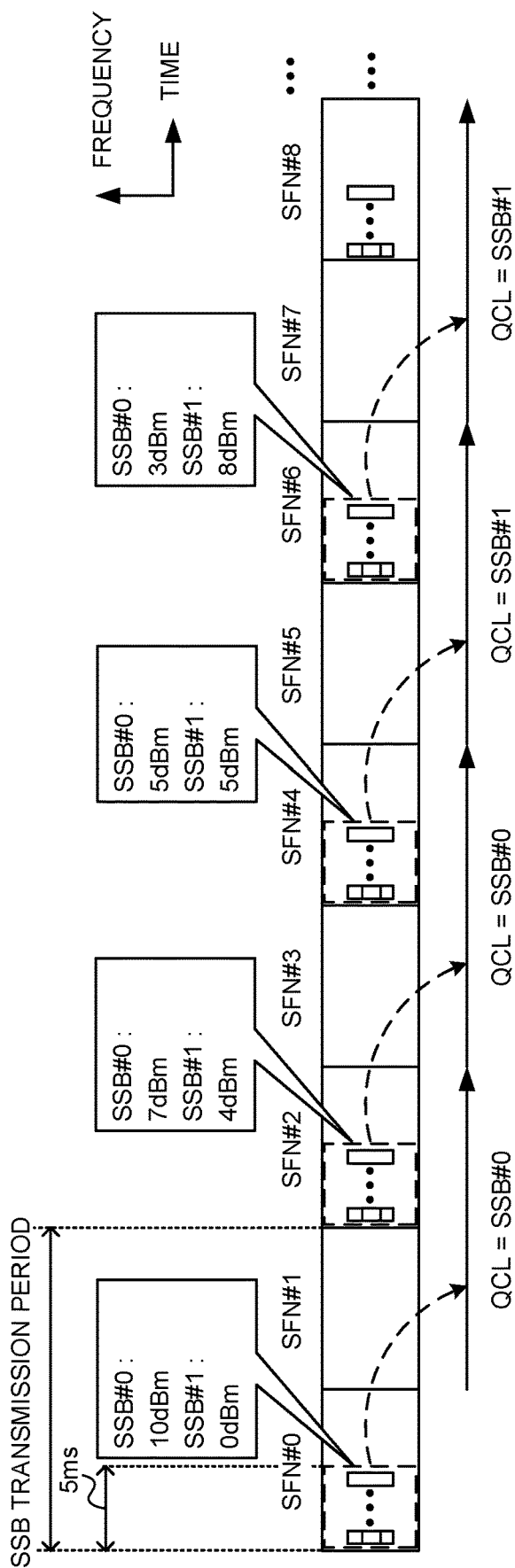
FIG. 7 is a diagram to show an example of the applicable duration of the TCI state/QCL assumption/QCL duration based on information related to beam transition.

FIG. 7 is a diagram to show an example of the applicable duration of the TCI state/QCL assumption/QCL duration based on the information related to beam transition. In FIG. 7, transition from SSB #0 to SSB #1 is reported to the UE in advance as the information related to beam transition. The UE performs measurement of SSB #0 and SSB #1 in each of SFN #0, SFN #2, SFN #4, and SFN #6.

In FIG. 7, measurement values of SSB #0 in SFN #0, SFN #2, SFN #4, and SFN #6 are respectively 10 dBm, 7 dBm, 5 dBm, and 3 dBm, and measurement values of SSB #1 therein are respectively 0 dBm, 4 dBm, 5 dBm, and 8 dBm. When the threshold X for "a measurement value of an assumed beam before transition"–"a measurement value of a beam after transition" is 2, the UE applies the QCL assumption of SSB #0 as the QCL assumptions through measurement of the SSBs in SFN #0 and SFN #2, and applies the QCL assumption of SSB #1 as the QCL assumptions through measurement of the SSBs in SFN #4 and SFN #6.

Note that the SSB period, the applicable duration of the TCI state/QCL assumption/QCL duration, the SSB measurement results, and the threshold shown in FIG. 7 are merely examples, and these are not restrictive.

<<Beam Transition Information>>

The following will describe the information related to beam transition. The UE may control reception of DL transmission transmitted from transmission points, based on the information related to beam transition. The beam transition may be interchangeably interpreted as TCI state transition or QCL transition. The information related to beam transition may be reported from the network (for example, the base station, the transmission point) to the UE using at least one of RRC signaling and MAC CE, or may be defined in a specification in advance.

The following will describe a case in which the UE controls communication with the transmission points (for example, the RRHs), based on the information related to beam transition.

Figures 8A, 8B:
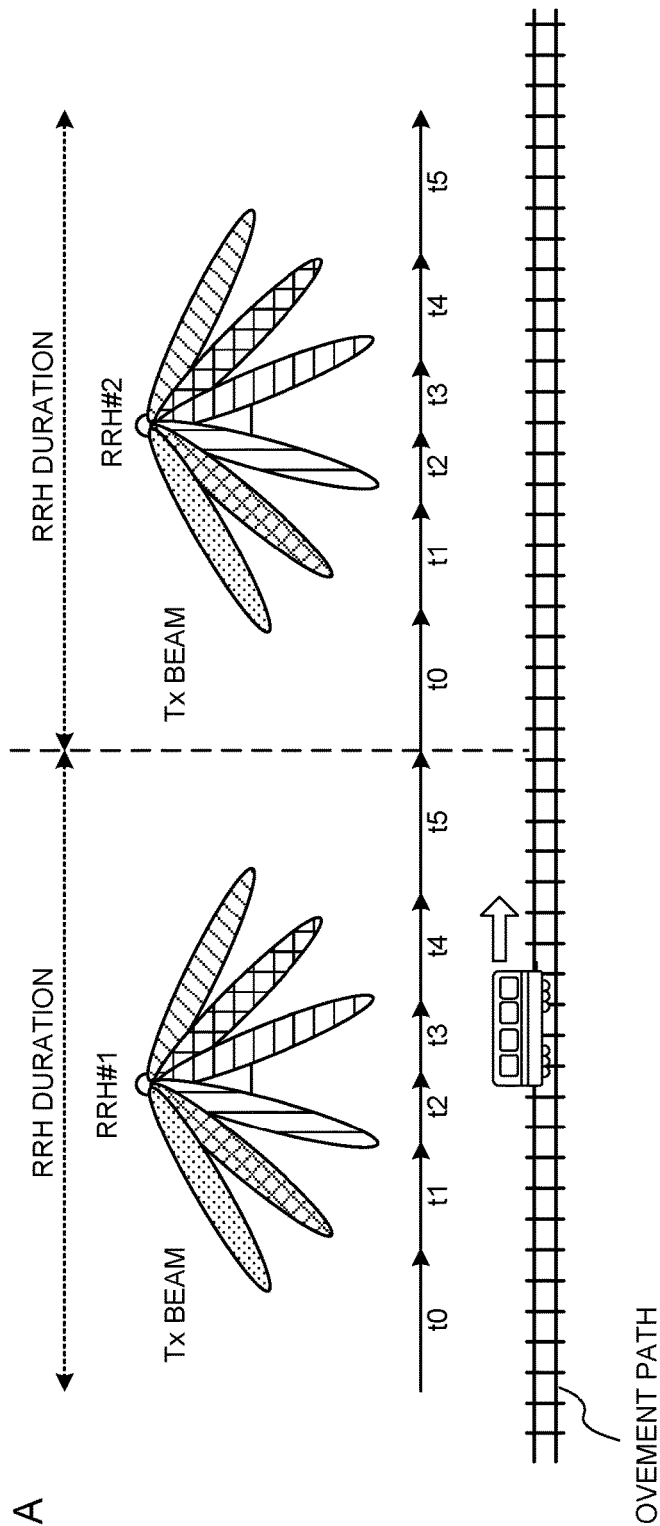
FIG. 8A and FIG. 8B are each a diagram to show an example of communication control according to a fourth embodiment.

FIG. 8A shows an example of a case in which the moving object performs communication with the transmission points (here, RRH #1 and RRH #2) installed in the movement path. Here, a case in which each RRH transmits a DL signal/DL channel by using a plurality of beams is shown. Each transmission point may be at least one of the uni-directional RRH and the bi-directional RRH.

Although the following description is given by taking an example of a case (DL transmission) in which a signal/channel is transmitted from the network (for example, the RRH) to the moving object (for example, the UE), this can be applied to UL transmission as well.

The information related to beam transition may include at least one of information related to transition of the TCI states, a duration corresponding to each beam (also referred to as a beam duration or beam time), and a duration corresponding to the RRH (also referred to as an RRH duration or RRH time). Note that the duration or time may be defined in the unit of at least one of a symbol, a slot, a sub-slot, a subframe, and a frame, or may be defined in the unit of ms or μs. The duration or time may be interpreted as a distance or an angle.

The information related to transition of the TCI states (for example, TCI #n→TCI #n+1) may be transition/ordering/index of the TCI states. The duration corresponding to the beam may be a duration/dwell-time of the beam. The duration corresponding to the transmission point (RRH) may be a duration/dwell-time of the RRH.

The duration corresponding to the RRH may correspond to a total value of the duration corresponding to each beam in the RRH. For example, the UE may acquire the duration corresponding to the RRH from the duration corresponding to each beam. In this case, the need of reporting the duration corresponding to the RRH to the UE or defining the duration in advance can be eliminated.

The TCI state and each beam duration may be associated with each other (see FIG. 8B). FIG. 8B is a diagram to show an example of a table in which the TCI state and each beam duration are associated with each other for indices (for example, t0, t1, t2, t3, t4, and t5) of each beam duration.

Each beam duration index (t0, t1, t2, t3, t4, t5) may correspond to a different beam. The beam duration index may be transitioned (or switched, changed, varied, updated) in order of t0, t1, t2, t3, t4, and t5, depending on movement of the moving object (UE).

Here, a case of transition in order of TCI state #0 (t0), TCI state #1 (t1), TCI state #2 (t2), TCI state #3 (t3), TCI state #4 (t4), and TCI state #5 (t5) is shown. In communication with the transmission points (RRHs #1 and #2), the UE may assume that the TCI states (or QCL) transition depending on the duration corresponding to each beam and control reception of DL transmission (see FIGS. 9A and 9B).

The upper diagram of FIG. 9A corresponds to a conceptual diagram taking a geographic domain into consideration in communication with RRH #1, and the lower diagram thereof shows transition of the TCI states in the time direction. Here, although units of slots (slot boundaries) are shown in the time direction, other units of time (for example, at least one of symbols, sub-slots, subframes, frames, ms, and μm) may be used. FIG. 9B shows an example of a table showing configured beam transition (or association between the TCI states and the beam durations).

When each beam duration expires, the UE may update the TCI state (or the QCL assumption), based on the configured transition ordering of the TCI states. For example, in communication with RRH #1, the UE may assume TCI state #0 in a corresponding beam duration (here, 4), and after the beam duration expires, the UE may switch to TCI state #1 to control reception of DL signal/channel.

In communication with the transmission point (RRH #1), the UE may determine a start point of the duration corresponding to a first beam duration index (for example, t0) or beam, based on a certain condition or method. For example, the UE (or the moving object) may perform the determination based on the current position acquired from the GPS or the like, or may perform the determination based on a certain signal (for example, a reference signal) transmitted from the transmission point.

In this manner, by controlling communication with the transmission point based on the information related to beam transition, the UE can appropriately perform communication even when the moving object moves at a high speed.

[Variation 1]

Figures 10A, 10B:
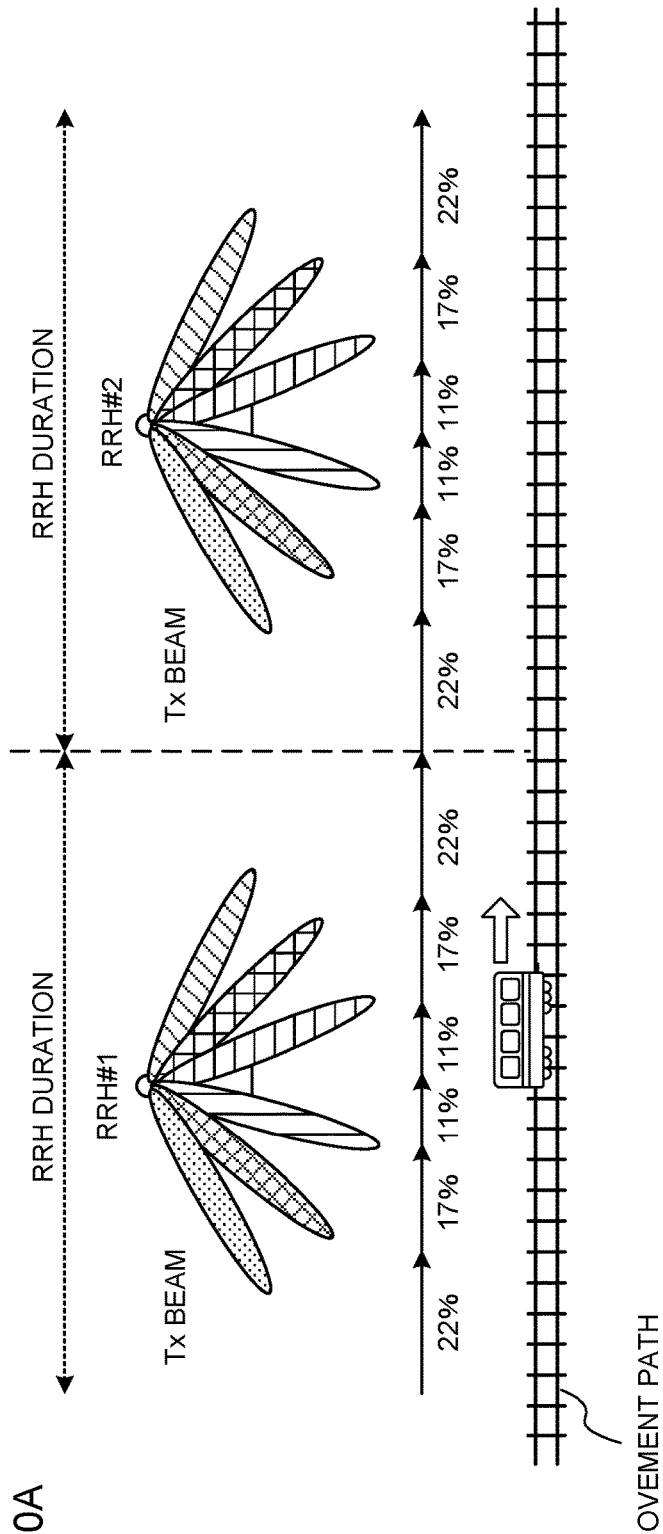
FIG. 10A and FIG. 10B are each a diagram to show another example of communication control according to the fourth embodiment.

The duration corresponding to the beam may be a ratio (for example, a Duration ratio, a dwell ratio, a dwell time ratio) of the duration in which each beam is used in the transmission point (see FIGS. 10A and 10B). The UE may control reception of DL transmission (for example, determine an assumed TCI state or QCL), based on the ratio of the duration in which each beam is used in each transmission point.

The beam duration need not be reported to or configured for the UE. In this case, the UE may vary (or switch, change, update) the TCI state in a blind manner, based on the transition ordering of the TCI states (or the QCLs).

[Variation 2]

The duration corresponding to the RRH may be information (for example, Distance/duration) related to a distance or a duration between the RRHs (for example, RRH #1 and RRH #2). For example, information related to an average distance or an average duration between adjacent RRHs (for example, RRH #n and RRH #n+1) may be reported to the UE (see FIG. 11A). Here, a case in which the average distance between the RRHs is indicated as 3 is shown.

Alternatively, the information related to the distance or the duration between the RRHs (for example, adjacent RRHs) may be reported to or configured for the UE (see FIG. 11B). When RRH #1 to RRH #6 are installed in the movement path, the UE may control reception of DL transmission in each RRH, based on the information related to the distance or the duration between the RRHs. For the reception of DL transmission in each RRH, the above-described method may be applied.

The UE can appropriately perform communication in each RRH by recognizing a relationship between the RRHs. Note that the information related to from between the RRHs or the information related to the duration between the RRHs may be reported from the base station to the UE using at least one of RRC signaling and MAC CE, or may be defined in a specification in advance.

[Variation 3]

The UE may control to detect (for example, blind detect) a certain TCI state from a plurality of TCI states in a certain beam duration. For example, when the TCI state corresponding to a beam duration t is #i, in the beam duration t, the UE may detect TCI state #i and other TCI state(s). The other TCI state(s) may be one or more TCI states transitioned before or after TCI state #i. TCI state #i and the other TCI state(s) may be included in a certain window (for example, a blind detection window).

FIG. 12A shows a case in which, in a beam duration t1, the TCI state is detected in a blind manner from TCI state #1 corresponding to t1 and TCI states #0 and #2 transitioned before and after TCI state #1. In other words, this corresponds to a case in which TCI states #1, #2, and #3 are included in the blind detection window. A range or a size of the blind detection window (for example, a range or a size of rows, indices, or TCI states) may be configured from the network, or may be defined in advance.

With this, communication with the transmission points can be performed based on an appropriate TCI state or QCL assumption even when the beam duration (or the TCI state) assumed by the UE and an actual position are not aligned.

[Variation 4]

A plurality of TCI states may correspond to each beam duration (see FIG. 12B). Here, a case in which two or more TCI states correspond to each beam duration is shown. The UE may detect (for example, detect in a blind manner) (for example, one) certain TCI state from a plurality of TCI states in each beam duration.

For example, the UE determines one TCI state from TCI states #0 and #1 in a beam duration t0. The determination of the TCI state may be performed based on a reception state (for example, received power or the like) when each TCI state is used.

[Variation 5]

When a plurality of TCI states correspond to each beam duration (see FIG. 12B), the UE may detect one or more TCI states depending on terminal capability (UE capability). For example, when the UE supports a capability (multi panel simultaneous reception) of simultaneously receiving DL transmission transmitted from a plurality of transmission points, the UE may detect two TCI states and perform reception processing.

In this manner, by causing a plurality of TCI states to correspond to the beam duration, DL transmission transmitted from a plurality of transmission points can be simultaneously received.

[Variation 6]

Figure 13:
FIG. 13 a diagram to show another example of correspondence between the TCI states and the beam durations according to the fourth embodiment.

A plurality of candidates for the TCI state corresponding to each beam duration may be configured, and the TCI state to be actually applied (or assumed) may be determined based on a certain condition (see FIG. 13). Here, a case of configuring two TCI states corresponding to each beam duration is shown. For example, a plurality of transition lists of the TCI states corresponding to each beam duration may be configured, and the list to be actually used may be selected out of the plurality of lists.

The TCI state list may be configured from the network to the UE using at least one of higher layer signaling and MAC CE, or may be defined in a specification in advance. The UE may determine one list of the plurality of lists, based on the downlink control information (DCI) or the PDCCH. For example, the TCI list may be indicated using a new bit field or an existing bit field included in the DCI. Alternatively, the TCI list may be selected based on a position or a resource (for example, a CCE/PRB/RE index) of the DCI detected by the UE.

When the TCI state (or the TCI state list) is indicated using the new bit feed in the DCI, the size (for example, the number of bits) of the new bit field may be determined based on the number of configured TCI states (or TCI state lists).

When one TCI state corresponds to each beam duration, the new bit field is unnecessary (not included in the DCI).

When a plurality of TCI states correspond to at least one of the beam durations, the new bit field may be included in the DCI.

In this manner, by selecting and using one TCI list out of a plurality of TCI state lists, the beam (or the TCI state) used for communication with each RRH can be flexibly configured.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 14:
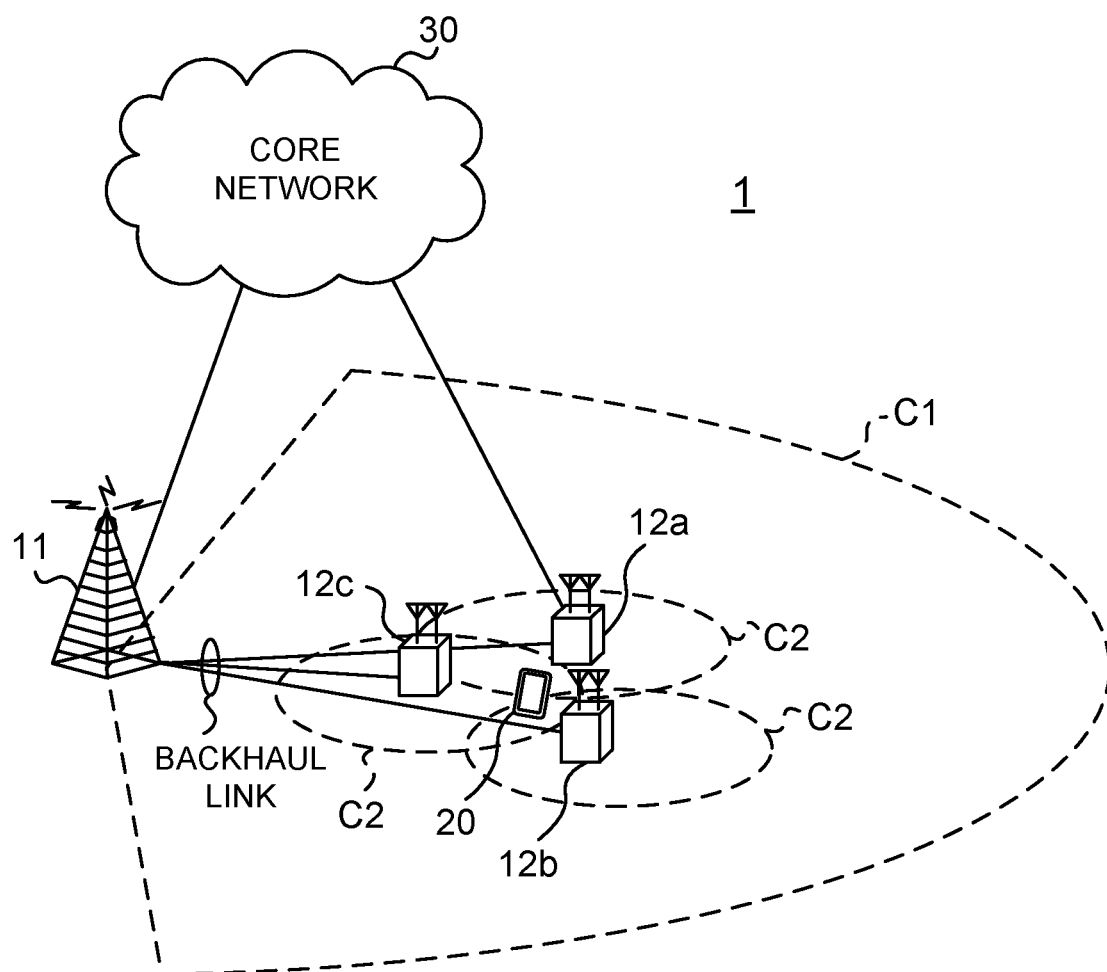
FIG. 14 is a diagram to show an example of a schematic structure of a radio communication system according to one embodiment.

FIG. 14 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations (for example, RRHs) 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 15:
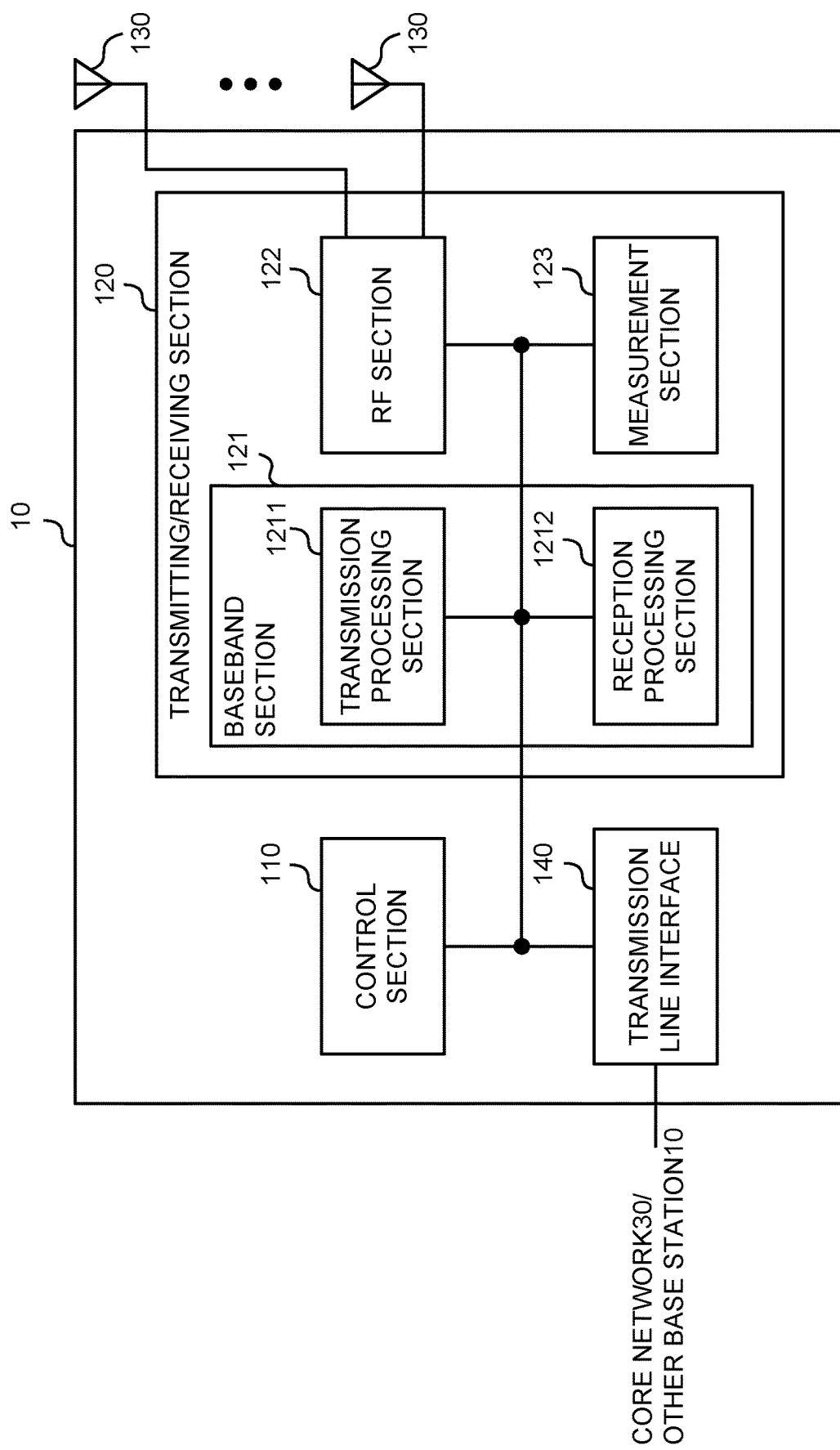
FIG. 15 is a diagram to show an example of a structure of a base station according to one embodiment.

FIG. 15 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The transmitting/receiving section 120 may transmit one or more synchronization signal blocks (SSBs) from one or more transmission points installed in a movement path. The control section 110 may determine a transmission configuration indication (TCI) state and an applicable duration of the TCI state to be applied to at least one of a channel and a signal to be transmitted, based on measurement results of the one or more SSBs (first and second embodiments).

(User Terminal)

Figure 16:
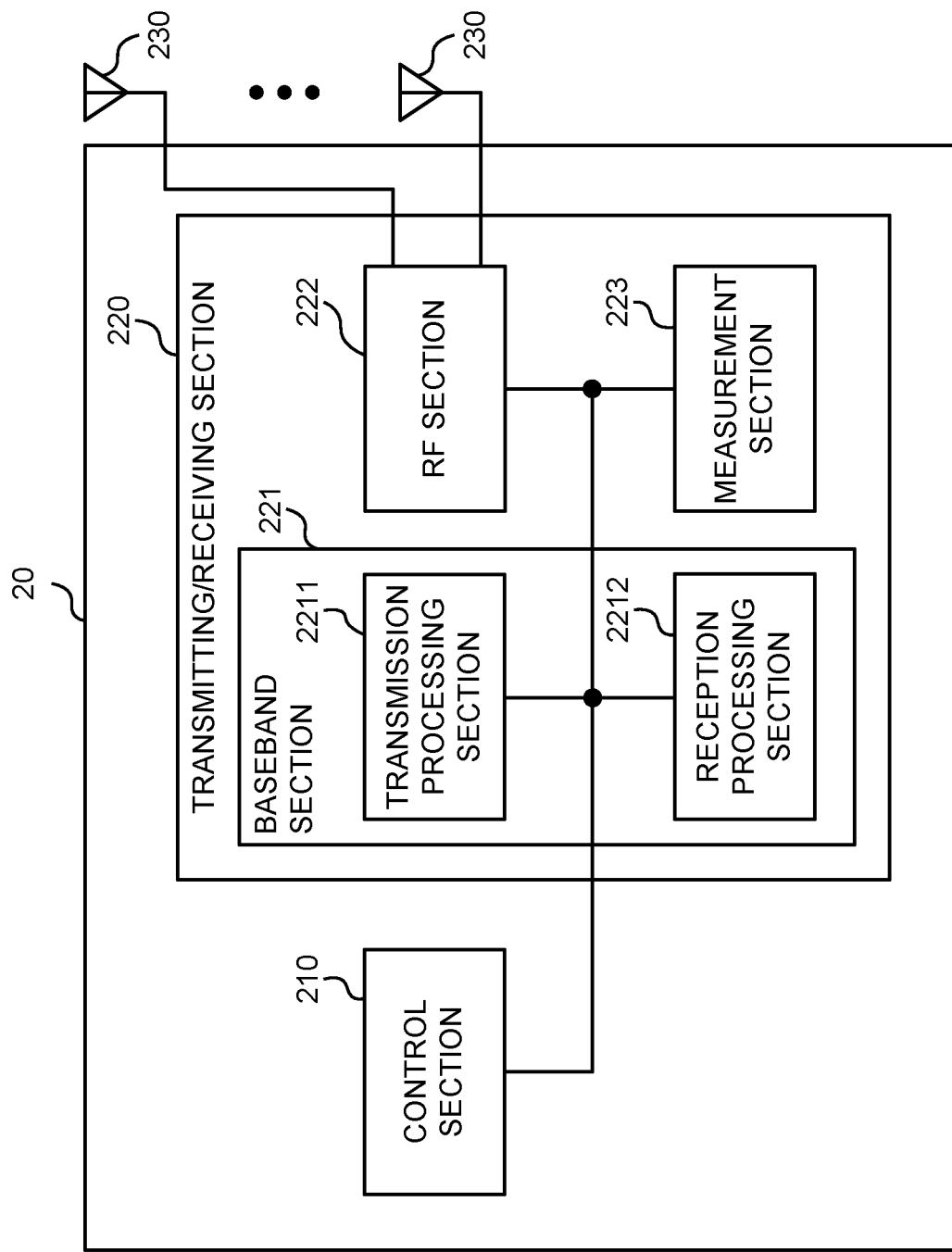
FIG. 16 is a diagram to show an example of a structure of a user terminal according to one embodiment.

FIG. 16 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive one or more synchronization signal blocks (SSBs) from one or more transmission points installed in a movement path. The control section 210 may determine a transmission configuration indication (TCI) state and an applicable duration of the TCI state to be applied to at least one of a channel and a signal received, based on measurement results of the one or more SSBs (first and second embodiments).

The control section 210 may assume that the one or more SSBs and at least one of the channel and the signal for performing transmission and/or reception have a relationship of a specific quasi-co-location type (third embodiment).

The control section 210 may derive the TCI state, based on quasi-co-location assumption obtained through the measurement results of the one or more SSBs (third embodiment).

The control section 210 may perform measurement of the one or more SSBs, based on information related to transition of the SSB(s) (fourth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 17:
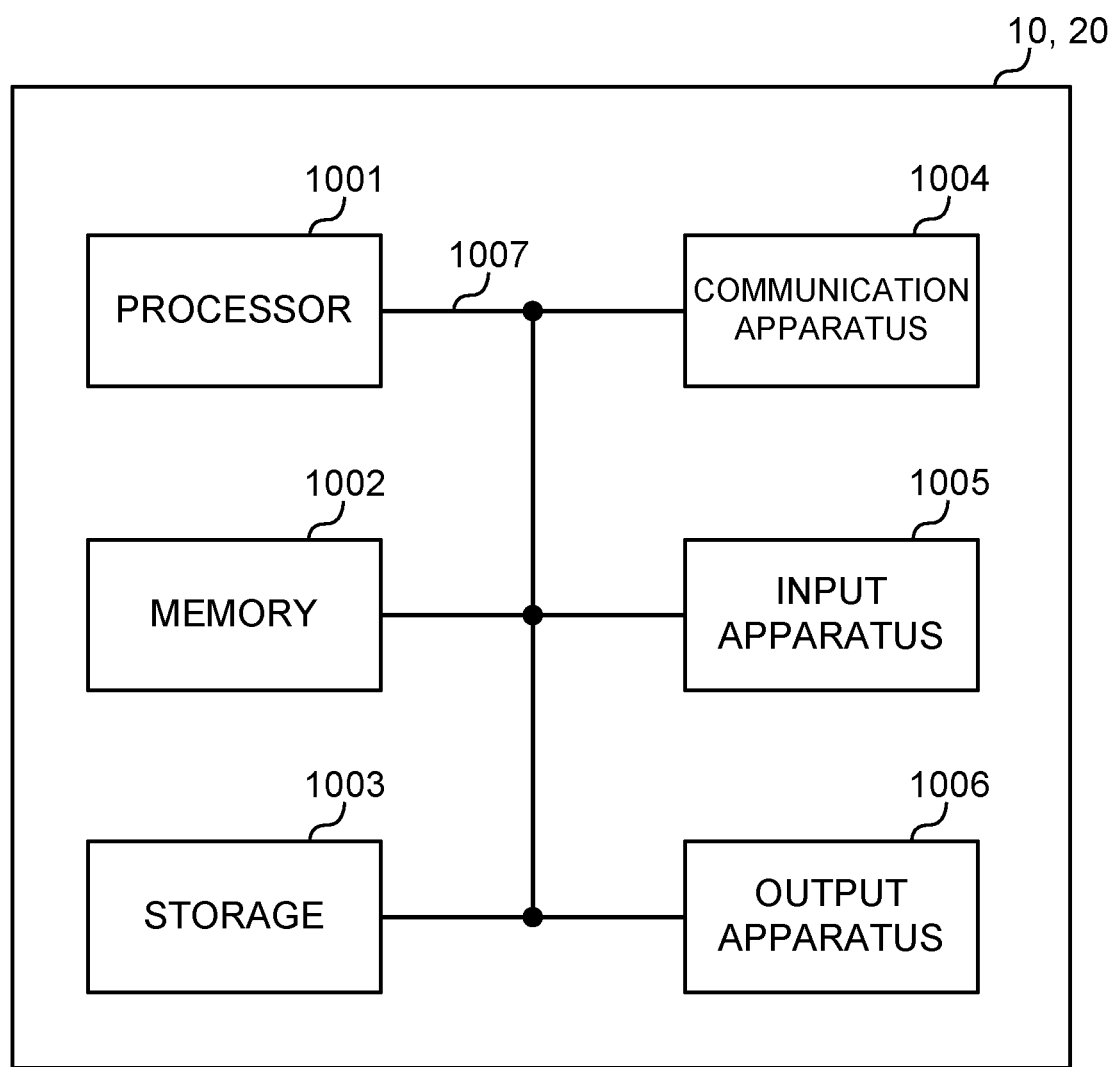
FIG. 17 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 17 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprises:
   a receiver that receives one or more synchronization signal blocks (SSBs) from one or more transmission points installed in a movement path; and
   a processor that determines, based on measurement results of the one or more SSBs, a quasi co-location assumption and an applicable duration of the quasi co-location assumption that are applied to at least one of a channel and a signal to be received,
   wherein the applicable duration of the quasi co-location assumption is determined after determining the measurement results of the one or more SSBs.

2. The terminal according to claim 1, wherein the processor assumes that the one or more SSBs and the at least one of the channel and the signal to be received have a relationship of a specific quasi co-location type.

3. The terminal according to claim 1, wherein the processor performs measurement of the one or more SSBs, based on information related to SSB transition.

4. A radio communication method for a terminal, comprising:
   receiving one or more synchronization signal blocks (SSBs) from one or more transmission points installed in a movement path; and
   determining, based on measurement results of the one or more SSBs, a quasi co-location assumption and an applicable duration of the quasi co-location assumption that are applied to at least one of a channel and a signal to be received,
   wherein the applicable duration of the quasi co-location assumption is determined after determining the measurement results of the one or more SSBs.

5. A base station comprises:
   a transmitter that transmits one or more synchronization signal blocks (SSBs) from one or more transmission points installed in a movement path; and
   a processor that controls to transmit at least one of a channel and a signal by applying, to the at least one of the channel and the signal, a quasi co-location assumption and an applicable duration of the quasi co-location assumption that are determined by a terminal based on measurement results of the one or more SSBs,
   wherein the applicable duration of the quasi co-location assumption is determined after determining the measurement results of the one or more SSBs.

6. A system comprising a terminal and a base station, wherein
   the terminal comprises:
      a receiver that receives one or more synchronization signal blocks (SSBs) from one or more transmission points installed in a movement path; and
      a processor that determines, based on measurement results of the one or more SSBs, a quasi co-location assumption and an applicable duration of the quasi co-location assumption that are applied to at least one of a channel and a signal to be received,
      wherein the applicable duration of the quasi co-location assumption is determined after determining the measurement results of the one or more SSBs, and
   the base station comprises:
      a transmitter that transmits the one or more SSBs; and
      a processor that controls to transmit the at least one of the channel and the signal by applying, to the at least one of the channel and the signal, the quasi co-location assumption and the applicable duration of the quasi co-location assumption that are determined by the terminal based on the measurement results of the one or more SSBs.

* * * * *